April 2, 1940.  W. W. HOFFMAN  2,196,113
SIGNALING DEVICE
Filed Nov. 6, 1936  3 Sheets-Sheet 1

Inventor
W. W. Hoffman,

By Bernard F. Garvey
Attorney

April 2, 1940.  W. W. HOFFMAN  2,196,113
SIGNALING DEVICE
Filed Nov. 6, 1936  3 Sheets-Sheet 2
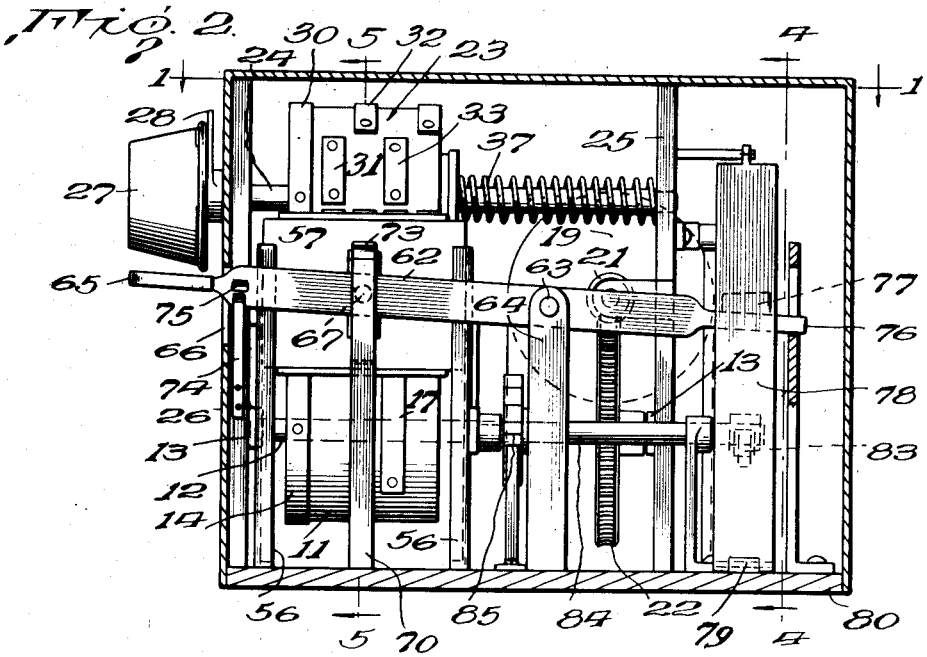
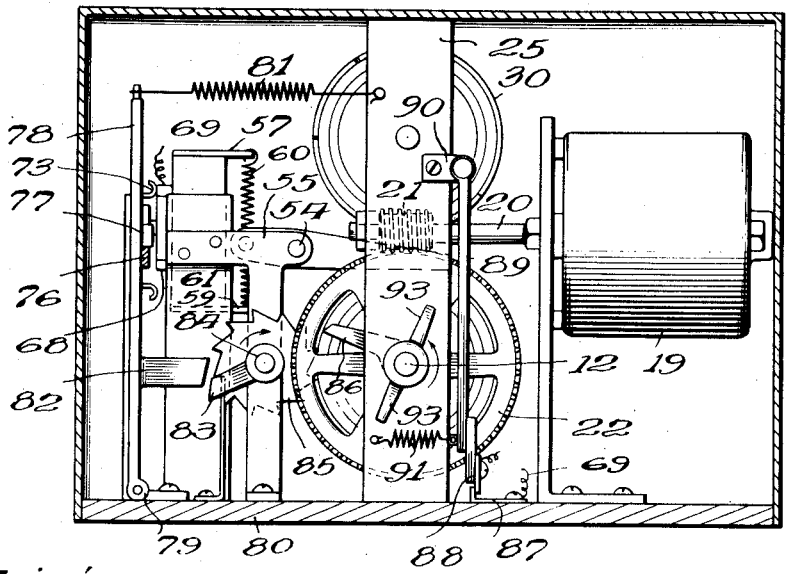
Inventor
W. W. Hoffman,
By Bernard F. Garvey
Attorney April 2, 1940.  W. W. HOFFMAN  2,196,113
SIGNALING DEVICE
Filed Nov. 6, 1936  3 Sheets-Sheet 3
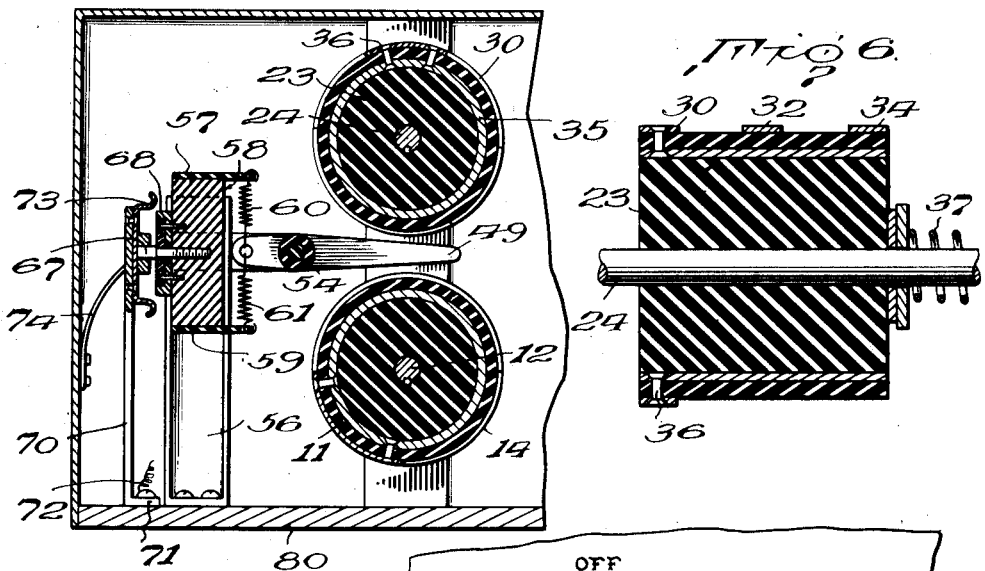
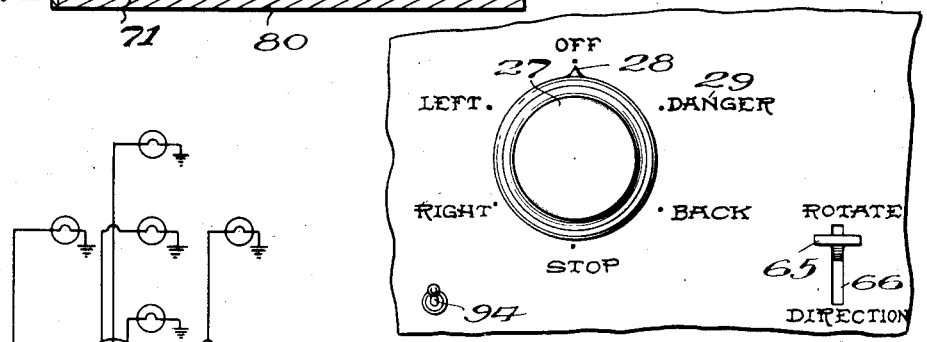
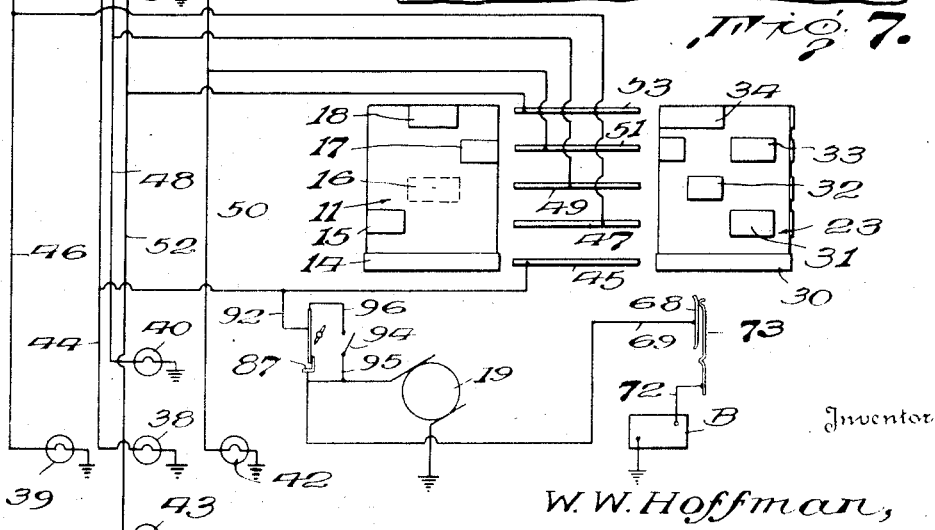
Inventor
W. W. Hoffman,
By Bernard S. Garvey
Attorney Patented Apr. 2, 1940

2,196,113

UNITED STATES PATENT OFFICE 2,196,113

SIGNALING DEVICE

William W. Hoffman, Johnstown, Pa.

Application November 6, 1936, Serial No. 109,594

8 Claims. (Cl. 177—337)

This invention relates to signaling devices and more particularly to a signal device adapted for use on motor vehicles.

An object of this invention is to provide a signaling device which is particularly adapted for use on motor vehicles such as trucks or the like, and which is so constructed as to give a selected signal at either the front or rear or both of the vehicle.

Another object of this invention is to provide an electrically operated signal which is under the control of the operator of the vehicle and which is so constructed that the operator may select a predetermined signal and set the controlling means for such signal whereupon the operating mechanism for the signal will operate to give the selected signal.

A further object of this invention is to provide a signaling device which may be used on trucks, trailers or like motor vehicles, and which will operate to give a predetermined signal in accordance with local regulations.

Still another object of this invention is to provide an electrically operated signal device which will operate from the electric current available in a motor vehicle and which includes means whereby the current to the operator and the signal will be cut off after a predetermined length of time.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a sectional view taken on the line 1—1 of Figure 2, and showing a signal operator constructed according to an embodiment of this invention.

Figure 2 is a sectional view taken on the line 2—2 of Figure 1.

Figure 4 is a sectional view partly in elevation taken on the line 4—4 of Figure 2.

Figure 5 is a fragmentary sectional view taken on the line 5—5 of Figure 2.

Figure 6 is an enlarged longitudinal section taken through the signal selector drum.

Figure 7 is a fragmentary front elevation of the panel or front of the housing for the operating mechanism.

Figure 8 is a diagrammatic view of the electric circuits incorporated in this invention.

Figure 1:
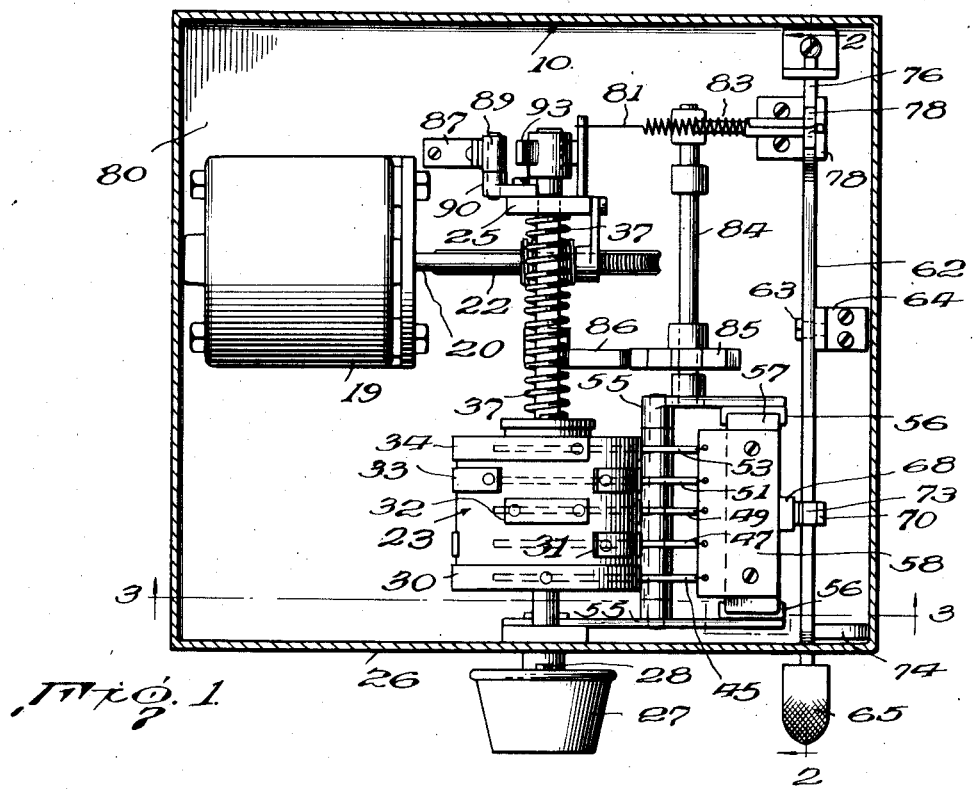

Referring to the drawings, the numeral 10 designates generally a casing which is adapted to enclose the operating mechanism embodied in this invention. A drum or rotatable contact member 11 is rotatably disposed in the housing 10 being mounted on a drive shaft 12 which is rotatably supported in bearings 13 secured to the housing 10. The contact drum 11 is provided with an annular contact ring 14 at one end thereof and also with a plurality of spaced apart contact segments or terminals 15, 16, 17 and 18. The drum 11 is rotated by means of a motor or power member 19 which is adapted to be connected to the battery or other source of electric current supply and the armature shaft 20 of the motor 19 is provided with a worm 21 which engages a worm gear 22, which is fixed to the drum shaft 12. The drum 11 constitutes the signal flashing means for continuously flashing the signal means hereinafter described.

A second contact drum 23 is mounted in the housing 10, being secured to a shaft 24 supported at one end in a vertically disposed bar or bearing member 25 and the shaft 24 at the opposite end extends through the front wall 26 of the housing 10 and has a knob 27 secured thereto. The knob 27 has a pointer 28 associated therewith which is adapted to be turned to selected positions as indicated by indicia 29 on the front wall or panel 26 of the housing 10. The drum 23 is provided at one end with an annular terminal or contact member 30 and with spaced apart segmental contact members 31, 32, 33 and 34. The drums 11 and 23 are each provided with an inner cylindrical member 35 which is electrically connected with the various contacts on the periphery of the drum 23 by means of rivets 36 or the like. In this manner, the electric current will first pass from the annular contact 30 into the cylindrical member 35 and then into the selected segmental contacts 31, 32, 33 and 34.

A spring 37 is disposed about the shaft 24 and at one end engages against the bearing member 25 and at the opposite end engages against the inner end of the drum 23 to frictionally hold this drum 23 against turning. In this manner, the knob 27 may be turned so that the pointer 28 will be in the selected position shown by the indicia 29 and will be frictionally maintained in this predetermined position. The drum 23 constitutes a signal selecting means so that any one of a number of different signals may be shown at either the front or rear or both of the vehicle.

A plurality of signal lights 38, 39, 40, 42 and 43, are adapted to be mounted on a suitable mounting means such as a frame or bracket in the form of a cluster at either the rear, front or both the rear and front of the vehicle. These signal lights are adapted to be operated by either of the contact drums 11 or 23 through the medium of a selector device as will be hereinafter described. The light 38 is preferably a center light in the cluster and is connected by means of a conductor 44 to a wiper 45. The light 39 is connected by a conductor 46 to a wiper 47, the light 40 being connected to a wiper 49 by means of a conductor 48. The light 42 is connected by a conductor 50 to a wiper 51 and the light 43 is connected by a conductor 52 to a wiper 53. The wipers 45, 47, 49, 51 and 53 are rockably mounted in spaced apart relation on a shaft 54 supported by brackets 55. These wipers are disposed between the two drums 11 and 23 in a position to selectively engage the contacts on either one of these drums.

A pair of channelled guide members 56 are fixedly mounted in the casing 10 and a slide member 57 engages in the confronting channels of these guide members 56. An insulating plate 58 is secured to the slide member 57 on the upper side thereof and a similar plate 59 is secured to the slide member 57 on the lower side thereof. An upper spring 60 is secured at one end to the upper plate 58 and at the opposite end to the outer end of a wiper as shown in Figure 5 and a lower spring 61 is secured at its upper end to the outer end of the wiper and at its lower end to the lower plate 59. There are two springs 60 and 61 for each wiper 45, 47, 49, 51 and 53 so that when the slide member 57 is moved up or down the inner ends of these wipers will contact with either the lower drum 11 or the upper drum 23. The slide member 57 is operated by means of a lever 62 which is pivoted as at 63 on a bracket 64 and this lever 62 extends outwardly through the front wall 26 of the casing 10 and is provided with a handle 65. The casing 10 is provided with an elongated slot 66 through which the lever 62 extends.

The lever 62 is pivoted, as at 67, to the slide member 57 and a plate 68 is secured to the outer face of the slide member 57 and comprises a movable terminal or switch member, being connected as by a conductor 69 to one side of a flashing means hereinafter described. A bracket 70 is secured as at 71 to the base of the housing 10 and a conductor 72 connects the bracket 70 to a source of current supply which, in the present instance, is a battery B. The bracket 70 has a U-shaped switch member 73 secured thereto which is disposed in a position for engagement with the plate 68. One arm of the switch member 73 is adapted to engage the plate 68 when this plate is moved upwardly and the other arm of this switch member is adapted to engage the plate 68 when the plate 68 and the slide 57 are moved downwardly. When the lever 62 is in a neutral or intermediate position, the plate 68 is disposed between the arms of the switch member 73 and disengaged therefrom.

A spring 74 is secured at one end to a wall of the housing 10 and projects inwardly in the direction of the lever 62 and is adapted to engage a detent 75 in the lever 62 when this lever 62 is in a neutral position. The inner end of the lever 62 is provided with an extension 76 and this extension is disposed in the path of a lug 77 which is carried by a rock arm 78. The rock arm 78 is pivoted at its lower end, as at 79, to the base 80 of the housing 10 and a spring 81 is secured at one end to the upper end of the rock lever or arm 78 and at the other end to the bar 25. The lever 78 is provided with a lug or cam member 82 at a point below the lug 77 which projects inwardly in the path of a pawl 83 mounted on a shaft 84. The shaft 84 has secured thereto a ratchet 85 and a rotatable pawl 86 is secured to the drive shaft 12 and is disposed in the path of the ratchet 85 so that at each revolution of the shaft 12, the pawl 86 will advance the ratchet 85 forwardly one division.

In order to provide a means for flashing the lights in the cluster there is provided a stationary terminal 87 which is secured to the base 80 and is connected to the conductor 69. A movable terminal or switch member 88 is secured to a swinging arm or lever 89 carried, as at 90, by the vertical bar 25. A spring 91 is secured at one end to the lever 89 and at the other end to the vertical bar 25 and constantly urges the movable terminal 88 toward the stationary terminal 87. The movable terminal 88 is connected to the conductor 44 as by a conductor 92. The flasher comprising the terminals 87 and 88 is operated by means of a pair or lugs 93 which are secured to the shaft 12 so that at each revolution of the shaft 12, the lever 89 will be rocked twice, the lugs 93 being disposed in diametrically opposed relation. The flasher hereinbefore described, may be cut out by means of a switch 94 which is connected as by a conductor 95 to the conductor 69, and by a conductor 96 to the conductor 92.

In the use and operation of this signaling device, when it is desired to flash the signal lights 39, 40, 42 and 43, alternately, the switch 94 is moved to an "on" position and the front end of lever 62 is swung upwardly. At this time, the plate 68 will contact with the upper leg of the switch member 73 thus closing the circuit from the conductor 72 to the conductor 69 and through the conductors 95, 96 and 92 to the conductor 44. The extension 76 of the lever 62 will be disposed below the lug 77 and will thus be held in the uppermost position. The springs 60 will swing the wipers or fingers 45, 47, 49, 51, and 53 downwardly into engagement with the drum 11. In this manner, the circuits to the signal lights will be closed upon rotation of the drum 11. At the time the lever 62 is raised the switch comprising the switch members 68 and 73 will be closed thus closing the circuit to the motor 19 and effecting rotation of this motor. Rotation of the motor 19 will rotate the drum 11 and the signals 39, 40, 42, and 43 will be operated in rotation while the signal 38 remains continuously lit. When the shaft 12 turns, the pawl 86 at each rotation of the shaft 12, will move the ratchet 85 forwardly one degree or division, thus rotating the circuit breaking pawl 83. When the pawl 83 has made substantially one complete revolution, this pawl will strike the lug 82 and release the extension 76 from the under side of the lug 77 so that the springs 60 and 61 will swing the lever 62 downwardly to a neutral or off position between the legs of the U-shaped switch member 73. This operation will break the circuit to the motor 19 and stop the motor and likewise break the circuit to the signal lights.

Figure 3:
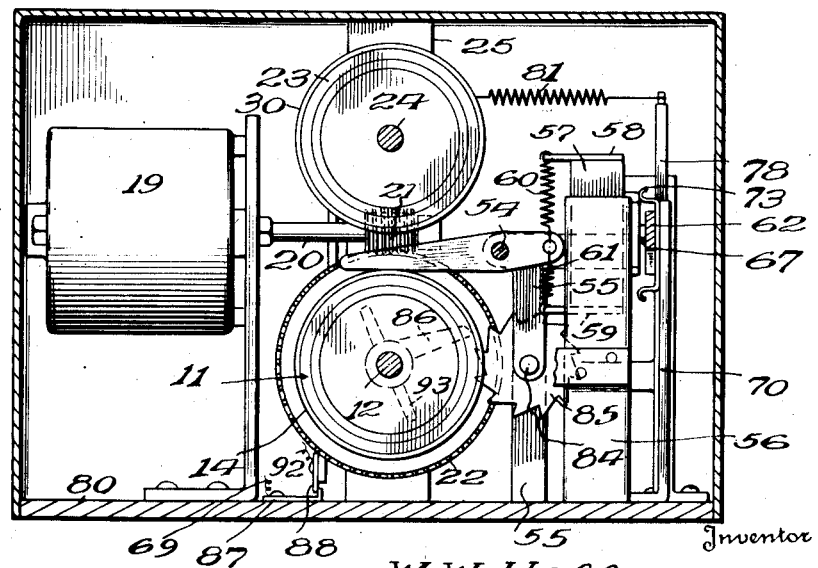
Figure 3 is a sectional view taken on the line 3—3 of Figure 1.

Assuming that it is desired to give a direction signal the knob 27 is turned to the desired indicia 29 on the front wall 26 of the housing 10 which will turn the drum 23 to bring the desired segmental terminals into confronting position to the circuit closing fingers 45, 47, 49, 51 and 53. When the drum 23 has been properly positioned the lever 62 is lowered, thus swinging the fingers 45, 47, 49, 51 and 53 upwardly into engagement with the segmental terminals positioned in confronting relation thereto. The motor 19 will be in circuit with the battery B through the closing of the switch comprising the contact members 68 and 73 and if it is desired to operate the selected signal lights without flashing the switch 94 is moved to an "on" position to bridge the flashing switch comprising the switch members 87—88. The releasing pawl 83 will be turned forward at each divisional movement of the ratchet 85 and when the pawl 83 makes substantially one complete revolution, the lever 78 will be swung to a released position, thus permitting the springs 60 and 61 to move the lever 62 to a neutral or off position. As shown in Fig. 3, when the lever 62 is raised, the springs 60 are tensioned, and the springs 61 are loose or untensioned, so that when the lever 62 is released the springs 60 will snap the lever 62 downwardly to a neutral position, and at the same time the springs 60 and 61 pulling against each other will swing the wipers to a neutral position similar to that shown in Fig. 5. The holding member 74 will at this time engage the lever 62 and maintain the lever 62 in a neutral position so that the springs 60 and 61 may maintain the wipers in their neutral or "off" position.

In the event it is desired to flash the direction signal which has been selected on the drum 23 the switch 94 is moved to an off position. The rotation of the shaft 12 will effect rocking movement of the lever 89 through engagement therewith of the lugs 93 mounted on the shaft 12 and the contacts 87 and 88 will be thereby alternately opened and closed. This flasher means may be used with any of the direction signals which may be selected on the drum 23.

This signaling device is adapted to be mounted in a convenient location in a motor vehicle so that it may be operated by the operator of the vehicle and in the event it is desired to operate the signals for a longer period than permitted by the single rotation of the releasing lug 83, the lever 62 may be returned from the neutral position to the selected upper or lower position by the operator of the device.

It is apparent that various changes may be made, especially in the details of construction, within the scope of the claims appended hereto:

What is claimed is:

1. A circuit closing and breaking means comprising a pair of cylindrical insulating members, means for supporting said members in spaced apart relation with the axes thereof in parallel relation, a plurality of contacts carried by each member, a plurality of wipers, means supporting said wipers with a portion thereof disposed in the space between said members, an operating member for said wipers, a slide, a guide means for said slide, opposed yieldable means engaging said slide and said wipers to normally hold said wipers in disengaged position, means connecting said operating member with said slide, means for turning one of said cylindrical members, means for holding said operating member in operating position, and means operatively connected with said turning means to release said operating member.

2. A circuit closing and breaking means comprising a pair of cylindrical insulating members, means for supporting said members in spaced apart relation with the axes thereof in parallel relation, a plurality of contacts carried by each member, a plurality of wipers, means supporting said wipers with a portion thereof disposed in the space between said members, means for manually adjusting one of said cylindrical members, means for rotating said other cylindrical member, an operating lever, means connecting said lever with said wipers and including opposed yieldable means normally maintaining said lever in inoperative position to thereby hold said wipers in disengaged position when said lever is in released position, means engageable with said lever to hold said lever in operative position, and means operatively connected with said power means to move said holding means to released position.

3. A circuit closing and breaking means comprising a pair of cylindrical insulating members, means for supporting said members in spaced apart relation with the axes thereof in parallel relation, a plurality of contacts carried by each member, a plurality of wipers, means movably supporting said wipers with a portion thereof disposed in the space between said members, means for manually rotating one of said cylindrical members, power means connected to the other cylindrical member for rotating said other cylindrical member, a slide, guide means for said slide, opposed yieldable means engaging said slide and said wipers and normally maintaining said wipers in disengaged position between said cylindrical members when said lever is in a released position, a slide adjusting lever pivotally connected to said slide, releasable holding means engageable with said lever to hold said lever in a selected position, and means connected to said power means for releasing said holding means after a predetermined length of time.

4. A circuit closing and breaking means comprising a pair of cylindrical insulating members, means for supporting said members in spaced apart relation with the axes thereof in parallel relation, a plurality of contacts carried by each member, a plurality of wipers, means supporting said wipers with a portion thereof disposed in the space between said members, means for manually adjusting one of said cylindrical members, power means operatively connected to the other cylindrical member for rotating said other cylindrical member, an operating lever, a slide, guide means for said slide, pivot means connecting said lever with said slide, opposed yieldable means engaging said slide and said wipers and normally maintaining said wipers in disengaged position between said cylindrical members, an extension carried by said lever, a latch lever, a lug carried by said latch lever and engageable with said extension to thereby hold said operating lever in a selected operating position, and means engageable with said latch lever and operable by said power member for swinging said latch lever to released position after a predetermined rotation of said power rotated cylindrical member.

5. A circuit closing and breaking means comprising a pair of cylindrical insulating members, means for supporting said members in spaced apart relation with the axes thereof in parallel relation, a plurality of contacts carried by each member, a plurality of wipers, means supporting said wipers with a portion thereof disposed in the space between said members, means for manually adjusting one of said cylindrical members, power means operatively connected to the other cylindrical member for rotating said other cylindrical member, an operating lever, opposed yieldable means connecting said lever and said wipers for normally maintaining said wipers in disengaged position between said cylindrical members and to allow the operating lever and associated wipers to return to neutral position, releasable holding means for holding said lever in a selected operative position, a pawl member, means for rotatably supporting said pawl member for rotation by said power member, and means carried by said holding means and disposed in the path of said pawl member to thereby move said holding means to released position.

6. A circuit closing member adapted to be interposed in a plurality of signal circuits, comprising a pair of cylindrical members, separate operating means for rotating said members, means supporting said members in spaced apart parallel relation, a plurality of spaced apart contacts on the periphery of each member, a plurality of spaced apart wipers, movable means supporting said wipers with a portion thereof disposed between said members for movement toward one or the other of said members, means for shifting said wipers for engagement with a selected member, a switch connected to one of said operating means, means connected to said switch and said wiper shifting means for closing said switch upon movement of said wipers into engagement with either member, and means operatively connected to one of said members for opening said switch after a predetermined rotation of said member.

7. A circuit closing member adapted to be interposed in a plurality of signal circuits, comprising a pair of cylindrical members, separate operating means for rotating said members, means supporting said members in spaced apart parallel relation, a plurality of spaced apart contacts on the periphery of each member, at least one of said contacts being of circular construction and certain others of said contacts being of segmental configuration with the segments forming each of such other contacts being disposed in circumferentially spaced apart relation, means connecting said segmental contacts with said circular contact, a plurality of spaced apart wipers, movable means supporting said wipers with a portion thereof disposed between said members in a position for engagement with said contacts, means for shifting said wipers for engagement with the contacts of a selected member, a switch connected to one of said operating means, and means operatively connected with said switch and said one operating means for opening said switch after a predetermined rotation of the member operated by said one operating means.

8. A circuit closing and breaking means comprising a pair of cylindrical insulating members, a motor operatively connected to rotate one of said members, means for supporting said members in spaced apart relation with the axes thereof in parallel relation, a plurality of contacts carried by each member, a plurality of wipers, a signal circuit for each wiper, means movably supporting said wipers with a portion thereof disposed in the space between said members in a position for movement to contact a selected cylinder, an operating member for said wipers, a switch connected to said motor and associated with said operating member and adapted to be closed upon movement of said operating member to either operating position to thereby effect engagement of said wipers with a selected cylindrical member for connecting said wipers and the contacts of the selected cylinder with selected signal circuits.

WILLIAM W. HOFFMAN.